(12) United States Patent
Ikemoto (10) Patent No.: US 12,280,966 B2
(45) Date of Patent: Apr. 22, 2025

(54) ROBOT ARM CONTROL DEVICE, PRODUCTION SYSTEM AND CONTROL METHOD OF ROBOT ARM

(71) Applicant: DENSO WAVE INCORPORATED, Aichi-pref. (JP)

(72) Inventor: Shintaro Ikemoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 150 days.

(21) Appl. No.: 17/748,167

(22) Filed: May 19, 2022

(65) Prior Publication Data

US 2022/0371833 A1 Nov. 24, 2022

(30) Foreign Application Priority Data

May 19, 2021 (JP) ................................. 2021-084640

(51) Int. Cl.
*B65G 47/90* (2006.01)

(52) U.S. Cl.
CPC ......... *B65G 47/905* (2013.01); *B65G 47/907* (2013.01)

(58) Field of Classification Search
CPC .... B65G 47/905; B65G 47/907; B65G 65/00; B65G 2203/0225; B65G 2203/0233; B65G 2203/041; B65G 47/917; B65G 43/08; B25J 9/0084; B25J 9/0093; B25J 9/1679; B25J 9/1682; B25J 9/161; B25J 9/1697; B25J 13/08; B25J 9/1664; G05B 19/4182; G05B 2219/39102; G05B 2219/45063; Y02P 90/02

USPC ........... 700/259, 245, 230, 213; 318/568.11, 318/568.16; 901/2
See application file for complete search history.

(56) References Cited

U.S. PATENT DOCUMENTS

| 5,040,056 | A  | * | 8/1991  | Sager ..................... B25J 9/0093 |
| 6,826,444 | B2 | * | 11/2004 | Herzog .................. B65B 5/105 |
| 2005/0107919 | A1 | * | 5/2005 | Watanabe .............. B25J 9/1656 |
| 2007/0007924 | A1 | * | 1/2007 | Nishihara .......... G05B 19/4182 |
| 2007/0179671 | A1 | * | 8/2007 | Arimatsu ........... G05B 19/4182 |
| 2012/0029688 | A1 | * | 2/2012 | Lager ............... G05B 19/41865 |
| 2013/0241042 | A1 |   | 9/2013 | Kwon |
| 2018/0029233 | A1 | * | 2/2018 | Lager .................... B25J 9/1676 |

(Continued)

FOREIGN PATENT DOCUMENTS

| CN | 112809678 A | 5/2021 |
| JP | 2011-125989 A | 6/2011 |

*Primary Examiner* — Ramon A. Mercado
*Assistant Examiner* — Ellis B. Ramirez
(74) *Attorney, Agent, or Firm* — Oliff PLC (57) ABSTRACT

A robot arm control device according to the present disclosure comprises a workpiece selecting section that selects a target workpiece, which is a workpiece to be picked up and placed, among a plurality of workpieces conveyed by a conveyor system in a predetermined flow direction; and a motion control section that controls a motion of the robot arm to pick up the target workpiece at a predetermined pick up position and place the target workpiece at the target placement position selected among a plurality of predetermined placement positions, wherein the workpiece selecting section selects, among the workpieces that are candidates for selection, the workpiece that has a shortest distance from the distal end position at a task-start timing to the workpiece position at the task-start timing as the target workpiece.

5 Claims, 9 Drawing Sheets

(56) References Cited

U.S. PATENT DOCUMENTS

| | | | |
|---|---|---|---|
| 2018/0127219 A1* | 5/2018 | Wagner | B65G 47/49 |
| 2019/0351549 A1* | 11/2019 | Suzuki | B25J 9/1697 |
| 2021/0101242 A1 | 4/2021 | Oowatari | |
| 2021/0308866 A1* | 10/2021 | Zhu | B25J 9/1612 |
| 2022/0088780 A1* | 3/2022 | Abdul-hadi | B25J 9/023 |

* cited by examiner

FIG.8

ROBOT ARM CONTROL DEVICE, PRODUCTION SYSTEM AND CONTROL METHOD OF ROBOT ARM

CROSS-REFERENCE TO RELATED APPLICATION

This application is based on and claims the benefit of priority from earlier Japanese Patent Application No. 2021-084640 filed May 19, 2021, the description of which is incorporated herein by reference.

BACKGROUND OF THE INVENTION

Technical Field of the Invention

The present invention relates to a robot arm control device, to a production system and to a control method of robot arm.

Related Art

There is known a production system in which multiple workpieces are conveyed by a conveyor system, such as a conveyor belt, to supply the workpieces to a production line in a factory, and a robot arm performs a predetermined task on the supplied workpieces.

SUMMARY

In an aspect of the present disclosure, there provided a robot arm control device that controls a robot arm that performs pick and place tasks, the robot arm control device comprising: a workpiece selecting section that selects a target workpiece, which is a workpiece to be picked up and placed, among a plurality of workpieces conveyed by a conveyor system in a predetermined flow direction; and a motion control section that controls a motion of the robot arm to pick up the target workpiece at a predetermined pick up position and place the target workpiece at the target placement position selected among a plurality of predetermined placement positions, wherein the workpiece selecting section sets some of the workpieces whose workpiece positions at a task-start timing are upstream of a distal end position of the robot arm at the task-start timing in the flow direction as candidates for selection, the task-start timing being a start timing of the pick and place task, and selects, among the workpieces that are the candidates for selection, the workpiece that has a shortest distance from the distal end position at the task-start timing to the workpiece position at the task-start timing as the target workpiece.

DETAILED DESCRIPTION OF THE PREFERRED EMBODIMENTS

JP 2011-125989 A discloses a method in which a plurality of workpieces is placed on a conveyor system by a robot arm. Also, there is known a production system in which multiple workpieces are conveyed by a conveyor system, such as a conveyor belt, to supply the workpieces to a production line in a factory, and a robot arm performs a predetermined task on the supplied workpieces. An example of such a task performed by the robot arm includes a pick and place task where the robot arm picks up a conveyed workpiece and places the workpiece at a predetermined placement position. In this case, the robot arm selects and picks up one of the workpieces conveyed by the conveyor system in a predetermined flow direction and places the picked up workpiece at the predetermined placement position in a placement tray.

In the production system in which the pick and place task as described above is performed, multiple robot arms are arranged along the flow direction of the conveyor belt to be in line from an upstream section to a downstream section in the flow direction, and each of the robot arms performs the same task. Conventionally, the robot arms of such a production system are designed to select and pick up one of the workpieces located most downstream in the flow direction placing the highest priority on reliably preventing the occurrence of missed workpieces.

The occurrence of the missed workpieces is reliably prevented with the conventional selection criterion of the workpiece as described above. Unfortunately, with the conventional selection criterion of the workpiece, depending on the position of the workpiece selected as a target of the task and the placement position in the placement tray in which the workpiece will be placed, the moving distance of the robot arm may be very long, which may undesirably increase the time required for the task. As a result, the operation time of the robot arm may possibly exceed an assumed cycle time of the equipment.

The present invention has been accomplished in view of the above circumstances and aims at providing a robot arm control device that shortens the time required for a pick and place task, a production system and a control method of robot arm.

In an aspect of the present disclosure, there provided a robot arm control device that controls a robot arm that performs pick and place tasks, the robot arm control device comprising:

a workpiece selecting section that selects a target workpiece, which is a workpiece to be picked up and placed, among a plurality of workpieces conveyed by a conveyor system in a predetermined flow direction; and a motion control section that controls a motion of the robot arm to pick up the target workpiece at a predetermined pick up position and place the target workpiece at the target placement position selected among a plurality of predetermined placement positions, wherein the workpiece selecting section sets some of the workpieces whose workpiece positions at a task-start timing are upstream of a distal end position of the robot arm at the task-start timing in the flow direction as candidates for selection, the task-start timing being a start timing of the pick and place task, and selects, among the workpieces that are the candidates for selection, the workpiece that has a shortest distance from the distal end position at the task-start timing to the workpiece position at the task-start timing as the target workpiece.

Although the time required for the pick and place task also depends on the orientation of the robot arms, the time mainly depends on the moving distance of the robot arms from the distal end position at the task-start timing to the position of the target workpiece at the point in time when the target workpiece is picked up, and the moving distance of the robot arms from the position of the target workpiece at the point in time when the target workpiece is picked up to the target placement position. Hereinafter, among these moving distances, the former moving distance is referred to as a first moving distance, and the latter moving distance is referred to as a second moving distance. According to the selection criterion of the target workpiece in the above configuration, among the workpieces that are the candidates for selection, the workpiece that has the shortest first moving distance is selected as the target workpiece. This shortens the time required for the pick and place task.

In this case, the workpiece selecting section sets the workpieces whose workpiece positions at the task-start timing are upstream of the current distal end position in the flow direction as the candidates for selection, and the workpieces whose workpiece positions at the task-start timing are downstream of the distal end position at the task-start timing in the flow direction are not included in the candidates for selection. The reason for this setting is as follows. That is, the workpieces are conveyed in the flow direction by the conveyor system, and the positions of the workpieces move in the flow direction every moment. If the workpiece whose workpiece position at the task-start timing is downstream of the distal end position at the task-start timing in the flow direction is selected as the target workpiece, the target workpiece continues moving in a direction that surely separates from the associated robot arm while the robot arm moves from the distal end position at the task-start timing toward the target workpiece. This results in unnecessarily increasing the first moving distance, or, in the worst case, the robot arm may fail to pick up the target workpiece.

In contrast, when the workpiece whose workpiece position at the task-start timing is upstream of the distal end position at the task-start timing in the flow direction is selected as the target workpiece, the target workpiece mostly moves toward the associated robot arm while the robot arm moves from the distal end position at the task-start timing toward the target workpiece. Thus, the possibility that the robot arm fails to pick up the target workpiece is very low, and the first moving distance is shortened. Thus, as in the above configuration, when the workpieces whose workpiece positions at the task-start timing are upstream of the distal end position at the task-start timing in the flow direction are set as the candidates for selection, the time required for the pick and place task is shortened while decreasing the possibility for the robot arm to fail to pick up the workpiece.

The robot arm control device may further comprise a position selecting section that selects the target placement position, which is the placement position at which the target workpiece will be placed, among the plurality of predetermined placement positions.

In the robot arm control device, the position selecting section may select, as a target placement position, one of the placement positions that has a shortest distance from a future workpiece position, which is a position of the target workpiece at a point in time when the workpiece is picked up by the robot arm.

In this case, the position selecting section selects one of the placement positions that has the shortest second moving distance as the target placement position. Thus, according to the above configuration, the first moving distance and the second moving distance, which mainly determine the time required for the pick and place task, are both shortened. As a result, the time required for the pick and place task is further shortened.

In the robot arm control device, the workpiece selecting section may selects another target workpiece on or after selection of the target placement position by the position selecting section.

In the robot arm control device, the plurality of workpieces may be conveyed so that two or more among them can exist in a width direction, which is orthogonal to the flow direction, of the conveyor system.

In another aspect of the present disclosure, there provided a production system comprising:

a conveyor system that conveys a plurality of workpieces in a predetermined flow direction;

a plurality of robot arms that perform pick and place tasks in which each robot arm picks up one of the workpieces conveyed by the conveyor system and places the picked up workpiece at one of a plurality of predetermined placement positions; and the above-mentioned robot arm control device, wherein the robot arms are arranged along the flow direction to be in line from an upstream section to a downstream section in the flow direction, and the robot arm control device is configured to control one or more of robot arm other than the robot arm located at a most downstream section in the flow direction among the robot arms.

The selection criterion of the target workpiece used in the above-mentioned robot arm control device puts the highest priority in shortening the time required for the pick and place task. This may result in causing missed workpieces. However, with the production system configured as described above, the robot arms that may miss the workpieces are not located at the most downstream section in the flow direction, and at least one robot arm is located further downstream. Thus, even if the robot arm controlled by the robot arm control device according to the first and second aspects misses any workpiece, the downstream robot arm can pick up the missed workpiece. Thus, according to the above configuration, the overall production system shortens the time required for the pick and place task while preventing the occurrence of missed workpieces.

In the production system, the robot arm located at the most downstream section in the flow direction may be configured to pick up a workpiece located at a most downstream section in the flow direction among the plurality of workpieces conveyed by the conveyor system and place the picked up workpiece at one of a plurality of placement positions.

In another aspect of the present disclosure, there provided a control method of robot arm to control a robot arm that performs pick and place tasks, the method comprising:

setting, among a plurality of workpieces conveyed by a conveyor system in a predetermined flow direction, some of the workpieces whose workpiece positions at a task-start timing are upstream of a distal end position of the robot arm at the task-start timing in the flow direction as candidates for selection, the task-start timing being a start timing of the pick and place task, selecting, among the workpieces that are the candidates for selection, the workpiece that has a shortest distance from the distal end position at the task-start timing to the workpiece position at the task-start timing as the target workpiece, and controlling a motion of the robot arm to pick up the target workpiece at a predetermined pick up position and place the target workpiece at a target placement position selected among a plurality of predetermined placement positions.

Embodiments according to the present disclosure will now be described with reference to the drawings. Note that, substantially the same components in the embodiments are given the same reference signs, and detailed explanations are omitted.

First Embodiment

A first embodiment will now be described with reference to FIGS. 1 to 8.

Figure 1:
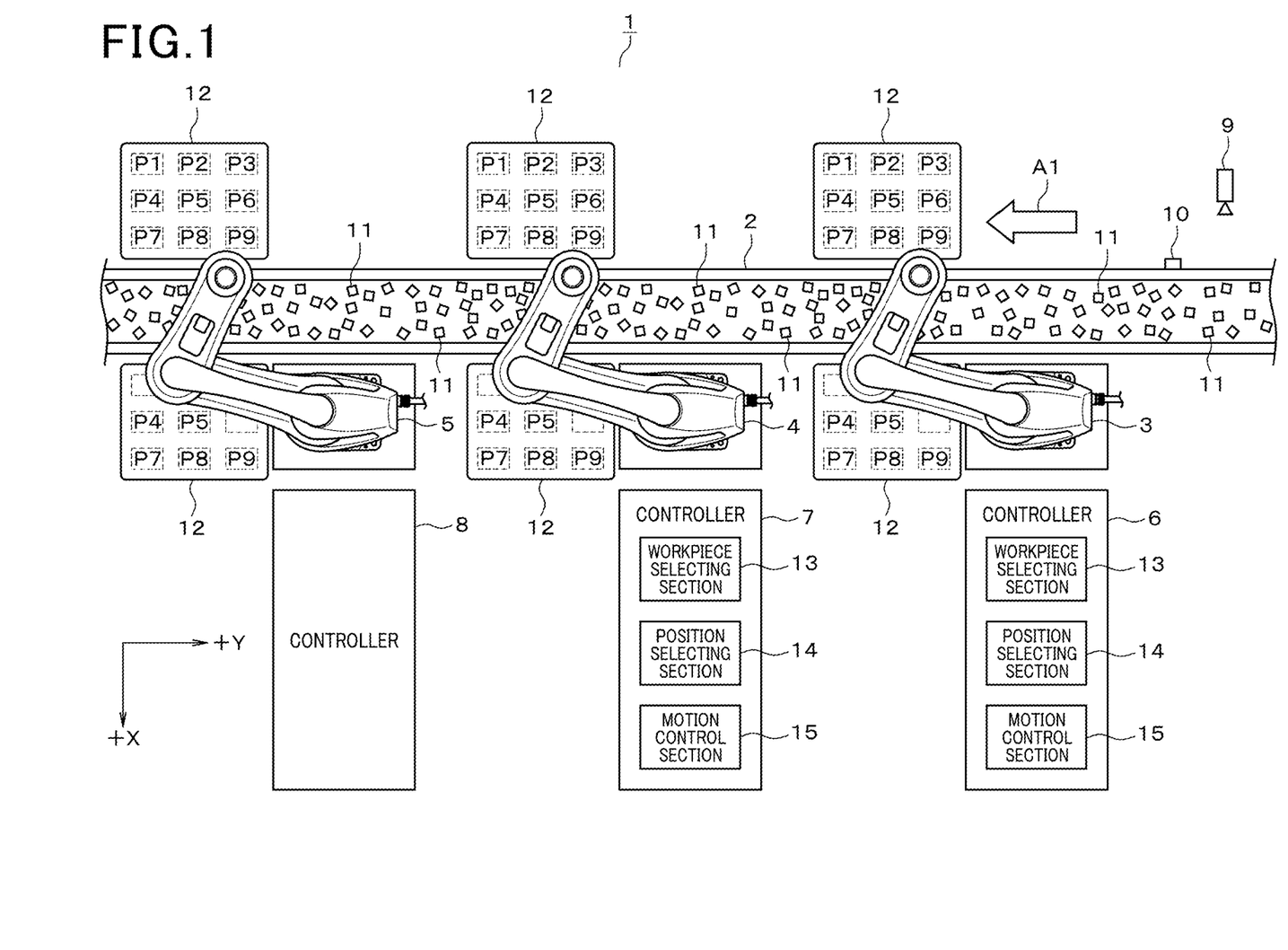
FIG. 1 is a schematic diagram illustrating a configuration of a production system according to a first embodiment.

As shown in FIG. 1, a production system 1 of the present embodiment includes, for example, a belt conveyor system, which is a conveyor belt 2 in this embodiment, robot arms 3, 4, and 5, controllers 6, 7, and 8, a vision system 9, and an encoder 10. The conveyor belt 2 conveys multiple workpieces 11 in a predetermined flow direction and functions as a conveyor system. In this description, the direction along a flow direction A1 of the conveyor belt 2 shown by an open thick arrow in FIG. 1, that is, the left and right direction in FIG. 1 is referred to as a Y-axis. The direction orthogonal to the Y-axis direction and the vertical direction, that is, the up and down direction in FIG. 1 is referred to as an X-axis. In this description, the right direction of the Y-axis in FIG. 1 is referred to as the positive direction, and the down direction of the X-axis in FIG. 1 is referred to as the positive direction.

In the production system 1, the workpieces 11 are conveyed by the conveyor belt 2 to supply the workpieces to a production line in a factory. The production system 1 includes a step as shown in FIG. 1, that is, a step in which, when the workpieces 11 are conveyed by the conveyor belt 2, the robot arms 3, 4, and 5 pick up the workpieces 11 and place them in placement trays 12, which are rectangular containers, in an aligned state. In other words, it includes a step of transporting the workpieces 11 from the conveyor belt 2 to the placement trays 12.

In the present embodiments, a description "a plurality of workpieces conveyed by a conveyor system in a predetermined flow direction" means that the plurality of workpieces 11 is conveyed so that two or more among them can exist in a width direction (the direction of the X-axis), which is orthogonal to the flow direction, of the conveyor system (the conveyor belt 2). In such a case, when the conveyor belt 2 is observed in the direction of the X-axis from a point in the direction of the Y-axis, only one of the workpieces 11 may be observed or 2 or more of the workpieces 11 may be observed. The average number of the workpieces, that is the average number of the workpieces 11 observed in the direction of the X-axis from a point in the direction of the Y-axis may be 1.5 or more and 200 or less, 3 or more and 150 or less, 5 or more and 1000 or less or 5 or more and 30 or less.

The conveyor belt 2 basically continues moving without stopping. The workpieces 11 are, for example, foods such as candies and snacks, which have been packaged in a previous process that is performed before the present process and are conveyed to the present process in an individually packaged state. The workpieces 11 are continuously conveyed by the conveyor belt 2 at a predetermined speed. Note that, in the figures such as FIG. 1, only some of the workpieces are denoted by reference signs, and the reference signs of other workpieces are omitted. The robot arms 3, 4, and 5 are configured as, for example, a horizontal articulated robot including a four-axis arm.

The robot arms 3, 4, and 5 perform pick and place tasks in which each of the robot arms 3, 4, and 5 picks up one of the workpieces 11 conveyed by the conveyor belt 2 and places the picked up workpiece 11 at one of predetermined placement positions. Specifically, each of the robot arms 3, 4, and 5 pivots the arm to bring its distal end above the conveyor belt 2, lowers a non-illustrated hand mounted on the distal end of the arm, and lifts the workpiece 11 by holding or sucking the workpiece 11 with the hand. Each of the robot arms 3, 4, and 5 pivots the arm to bring its distal end above the associated placement tray 12, lowers the hand, and releases the workpiece 11 from the hand at the predetermined placement position in the placement tray 12. In this case, the placement positions include nine placement positions P1 to P9 in each placement tray 12.

The robot arms 3, 4, and 5 are located along the flow direction A1 of the conveyor belt 2, that is, along the Y-axis to be in line from the upstream section to the downstream section in the flow direction A1. The robot arm 3 located at the most upstream section in the flow direction A1 is controlled by the controller 6. The robot arm 4 located at the second most upstream section in the flow direction A1 is controlled by the controller 7. The robot arm 5 located at the most downstream section in the flow direction A1 is controlled by the controller 8. As described above, the controllers 6, 7, and 8 control the robot arms 3, 4, and 5, respectively, and function as a robot arm control device.

The placement trays 12 in which the workpieces 11 will be placed by the robot arm 3 are located in the vicinity of the robot arm 3 on both sides of the conveyor belt 2 to face each other with the conveyor belt 2 located in between. The placement trays 12 in which the workpieces 11 will be placed by the robot arm 4 are located in the vicinity of the robot arm 4 on both sides of the conveyor belt 2 to face each other with the conveyor belt 2 located in between. The placement trays 12 in which the workpieces 11 will be placed by the robot arm 5 are located in the vicinity of the robot arm 5 on both sides of the conveyor belt 2 to face each other with the conveyor belt 2 located in between.

The production system 1 achieves a conveyor tracking function that enables the robot arms 3, 4, and 5 to track the workpieces 11 and perform pick and place tasks without stopping the conveyor belt 2 with the following configuration. That is, the vision system 9, which includes components such as a camera, takes images of the workpieces 11 in a predetermined imaging range upstream of the robot arms 3, 4, and 5 in the flow direction A1.

The non-illustrated control device or the controllers 6, 7, and 8 execute a predetermined image recognition process on images captured by the vision system 9 to acquire the position and orientation of the workpieces 11 on the conveyor belt 2. The encoder 10, which is mounted on the conveyor belt 2, outputs pulse signals corresponding to the moving distance and moving speed of the conveyor belt 2. Based on the pulse signals, the control device or the controllers 6, 7, and 8 sequentially calculate how the workpieces 11 the position and orientation of which have been acquired in the imaging range will be delivered and cause the robot arms 3, 4, and 5 to track the workpieces 11.

Although the detailed description will be omitted, the controller 8 that controls one of the three robot arms 3, 4, and 5 located at the most downstream section in the flow direction A1, that is, the robot arm 5 has the configuration and function that are the same as those of the conventional controller. Thus, the robot arm 5 is designed to select and pick up one of the workpieces 11 located most downstream in the flow direction A1 placing the highest priority on reliably preventing the occurrence of missed workpieces 11.

The controllers 6 and 7 that control the robot arms 3 and 4 other than the robot arm 5 located at the most downstream section in the flow direction A1 among the three robot arms 3, 4, and 5 both have the following unique configuration and function. In each of the following descriptions, although the specific configuration and function of the controllers 6 and 7 will be described with an example of the controller 6, the specific configuration and function of the controller 7 are the same. The controller 6 controls the robot arm 3 by executing a computer program by control means including a computer constituted by a non-illustrated CPU, ROM, and RAM.

Specifically, the controller 6 includes a drive unit constituted by, for example, an inverter circuit. The controller 6 drives each of the motors that drive the axes of the robot arm 3 by, for example, feedback control based on the rotational position of each motor detected by the encoder corresponding to the motors. The controller 6 executes a previously set motion program to control the robot arm 3 so that each axis of the robot arm 3 automatically executes a predetermined motion.

The controller 6 includes function blocks such as a workpiece selecting section 13, a position selecting section 14, and a motion control section 15. The function blocks are achieved by the CPU of the controller 6 executing computer programs stored in the ROM to execute processes corresponding to the computer programs, that is, the function blocks are achieved by software. Note that, at least a part of the function blocks may be achieved by hardware.

The workpiece selecting section 13 selects a target workpiece, which is the workpiece 11 to be picked up and placed, among the workpieces 11. Specifically, the workpiece selecting section 13 sets some of the workpieces 11 the current workpiece positions of which are upstream of the current position of the distal end, or the hand, of the robot arm 3, which is referred to as the current distal end position, in the flow direction A1 as candidates for selection and selects, as the target workpiece, the workpiece 11 that has the shortest distance from the current distal end position to the current workpiece position among the workpieces 11 that are the candidates for selection.

The position selecting section 14 selects a target placement position, which is the placement position at which the target workpiece will be placed, among the placement positions P1 to P9. Specifically, the position selecting section 14 selects, as the target placement position, the placement position that has the shortest distance from a future workpiece position, which is an estimated position of the target workpiece at the point in time when the workpiece 11 is picked up by the robot arm 3, among the placement positions P1 to P9. The motion control section 15 controls the motion of the robot arm 3 to pick up the target workpiece selected by the workpiece selecting section 13 at a predetermined pick up position and place the picked up target workpiece at the target placement position selected by the position selecting section 14.

Next, an example of a specific motion regarding the pick and place tasks executed by the controller 6, which controls the robot arm 3 configured as described above, will be described with reference to FIGS. 2 to 7. Note that, in FIGS. 2 to 7, the illustration of the robot arm 3 is omitted, and only the position of the distal end of the robot arm 3 is shown with a dotted circle. The description assumes that the robot arm 3 has placed the workpiece 11 at the placement position P9 in the previous task. In this case, since the distal end of the robot arm 3 is located at the placement position P9, the placement position P9 will be the initial current distal end position.

Figure 2:
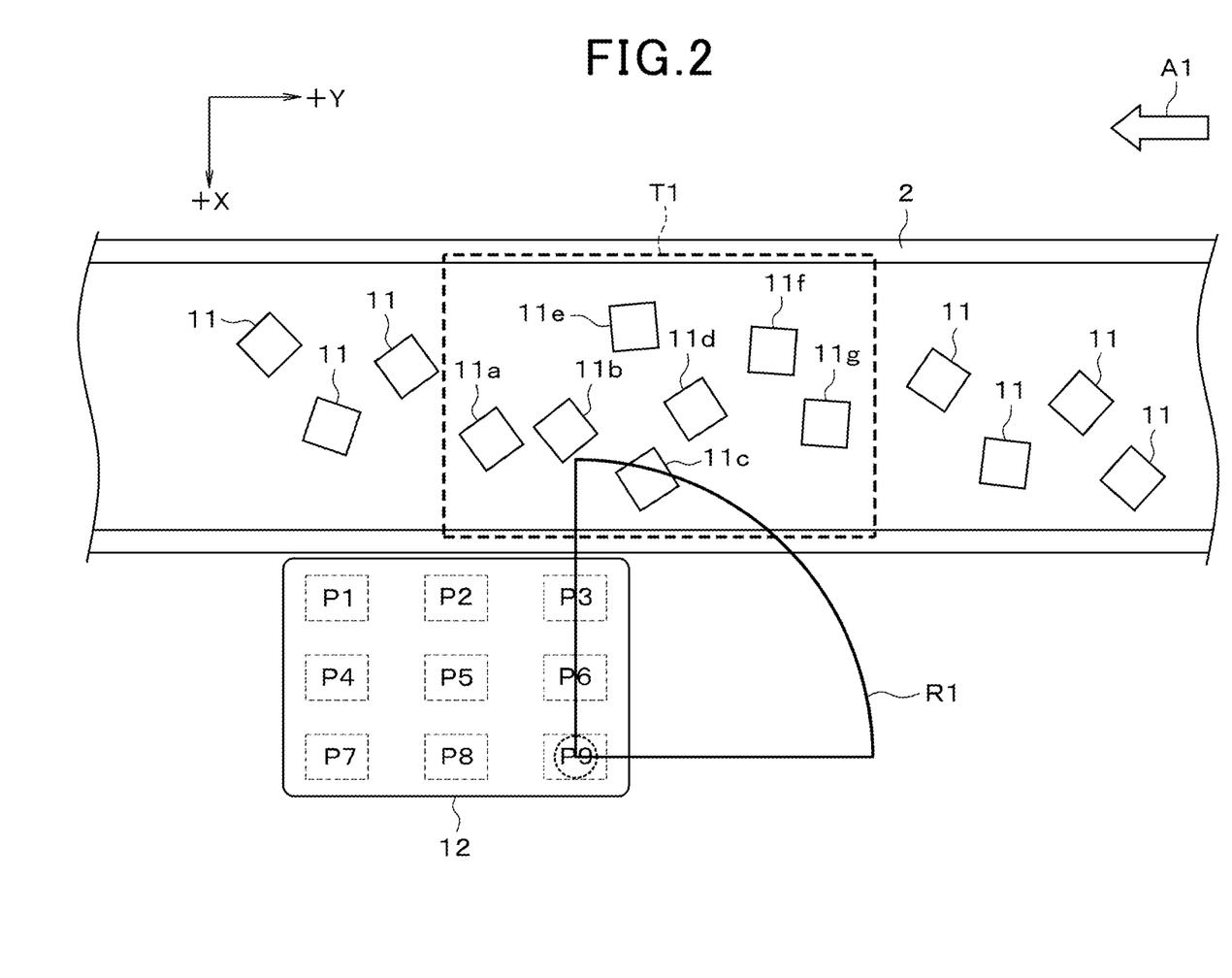
FIG. 2 is an explanatory diagram of an example of a specific motion regarding a pick and place task according to the first embodiment.

In this case, a tracking range covers a range T1 surrounded by a dashed rectangle in FIG. 2, and the robot arm 3 regards seven workpieces 11 within the range T1 as the subjects of tracking. In the following description, the seven workpieces 11 that will be the subject of tracking are distinguished using lower-case alphabets a to g at the end of the numerals. Note that, when the seven workpieces 11 do not need to be distinguished from each other, the seven workpieces 11 will be collectively referred to as the workpieces 11 omitting the trailing alphabets characters. Note that, the positions of the workpieces 11 in FIG. 2 show the current workpiece positions.

The workpiece selecting section 13 forms, as shown in FIG. 2, a first search range R1, which is a search range having a sector of 90 degrees extending in the negative X-axis direction and the positive Y-axis direction with its center at the current distal end position. The workpiece selecting section 13 gradually expands the first search range R1, which is the sector of 90 degrees as described above, and selects the workpiece 11 that is detected first in the first search range R1 as the target workpiece. In the present embodiment, when the central position of any workpiece 11 exists within the first search range R1, the workpiece selecting section 13 determines that the workpiece 11 exists within the first search range R1. That is, since the workpiece selecting section 13 determines the existence of each workpiece 11 by a dot in this case, the possibility that multiple workpieces 11 are detected first is very low. In this case, since the workpiece selecting section 13 detected the workpiece 11c first in the first search range R1, the workpiece 11c is selected as the target workpiece.

Figure 3:
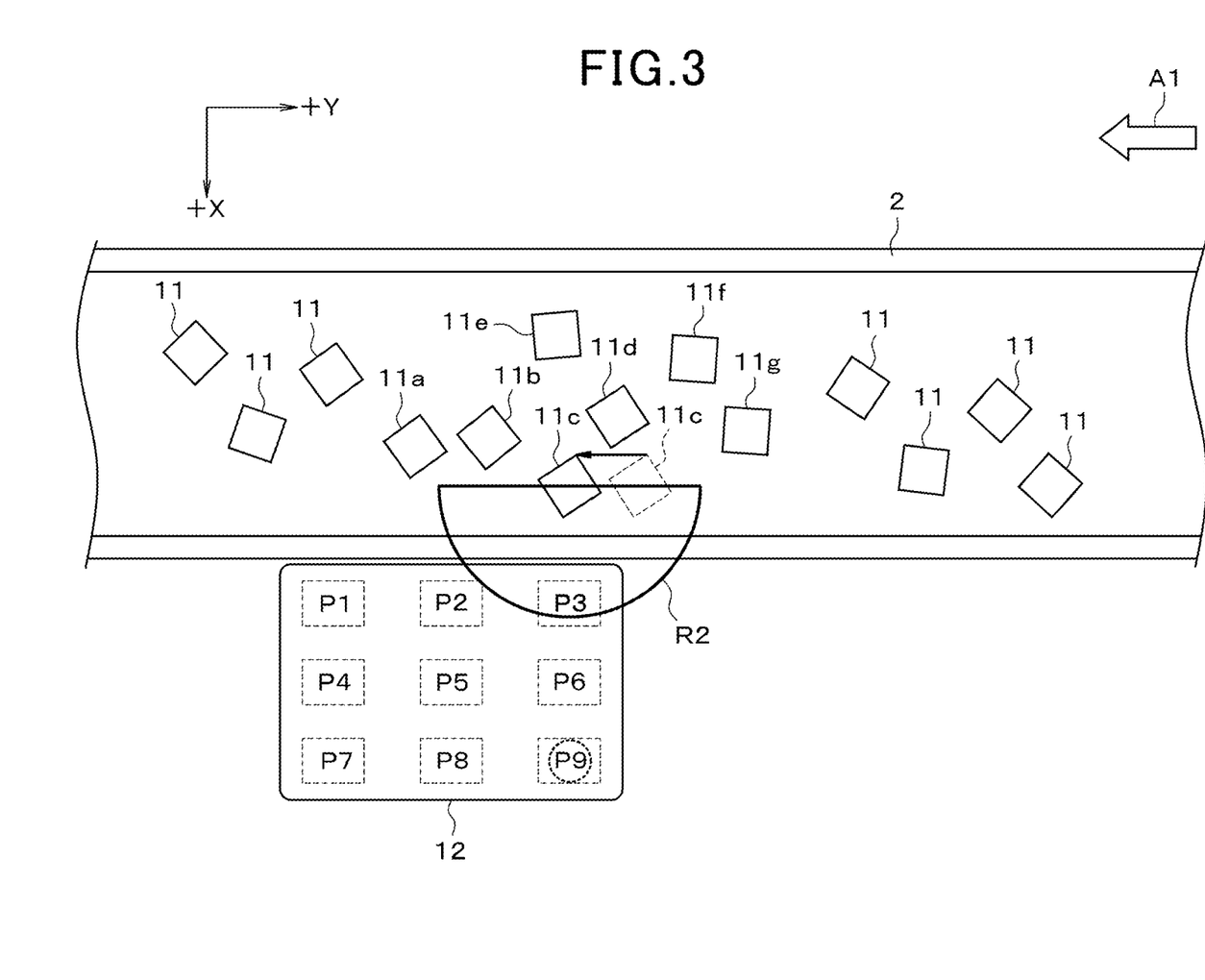
FIG. 3 is an explanatory diagram of an example of a specific motion regarding the pick and place task according to the first embodiment.

Subsequently, the controller 6 obtains the future workpiece position, which is the estimated position of the target workpiece, which is the workpiece 11c in this case, at the point in time when the robot arm 3 picks up the workpiece 11c. Such calculation of the future workpiece position is achieved by the conveyor tracking function described above. Note that, in FIG. 3, the future workpiece positions of the workpieces 11 are shown by solid lines, and the current workpiece position of the workpiece 11c is shown by a dashed line. As shown in FIG. 3, the future workpiece position of the workpiece 11c is shifted from its current workpiece position in the negative Y-axis direction by an amount corresponding to the time required for the robot arm 3 to move to pick up the workpiece 11c.

As shown in FIG. 3, the position selecting section 14 forms a second search range R2, which is a search range having a sector of 180 degrees extending in the positive X-axis direction, that is, toward the placement tray 12 in which the workpiece 11c will be placed with its center at the future workpiece position of the workpiece 11c. In this case, since the placement positions P1 to P9 in the placement tray 12 located on the side of the conveyor belt 2 in the positive X-axis direction are set as the subjects of search, the second search range R2 having a sector of 180 degrees extending in the positive X-axis direction is formed. However, when the placement positions P1 to P9 in the placement tray 12 (not shown) located on the side of the conveyor belt 2 in the negative X-axis direction are set as the subjects of search, the position selecting section 14 only needs to form the second search range R2 having a sector of 180 degrees extending in the negative X-axis direction.

The position selecting section 14 gradually expands the second search range R2, which is the sector of 180 degrees as described above, and selects the placement position that is detected first in the second search range R2 as the target placement position. In the present embodiment, when the central position of any placement position exists within the second search range R2, the position selecting section 14 determines that the placement position exists within the second search range R2. That is, since the position selecting section 14 determines the existence of each placement position by a dot in this case, the possibility that multiple placement positions are detected first is very low. In this case, since the position selecting section 14 detected the placement position P3 first in the second search range R2, the placement position P3 is selected as the target placement position.

Figure 4:
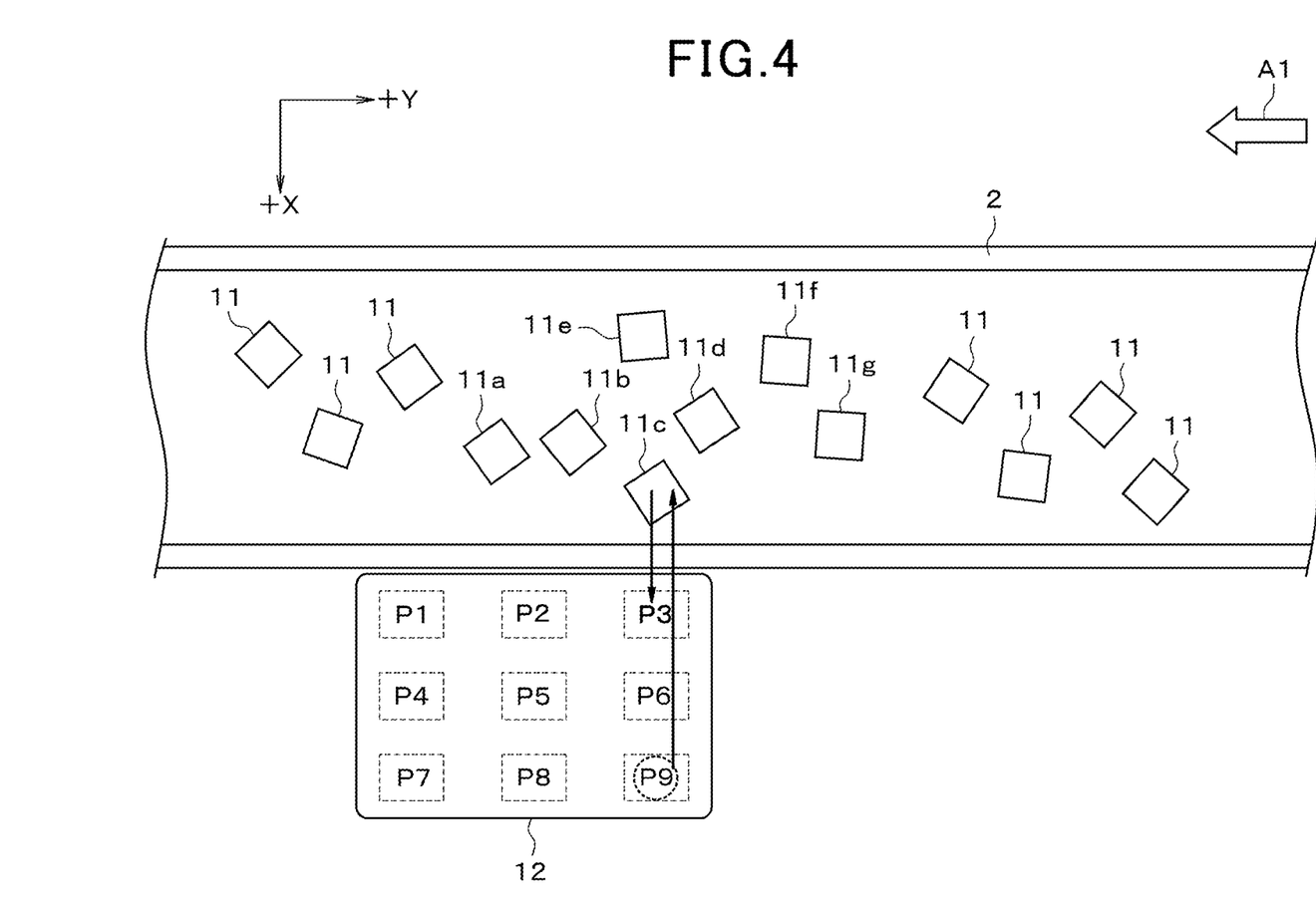
FIG. 4 is an explanatory diagram of an example of a specific motion regarding the pick and place task according to the first embodiment.

Subsequently, the motion control section 15 controls the motion of the robot arm 3 to pick up the workpiece 11c selected as the target workpiece by the workpiece selecting section 13 and place the workpiece 11c at the placement position P3 selected as the target placement position by the position selecting section 14. As shown by a solid arrow in FIG. 4, the motion trajectory of the robot arm 3 in this case extends from the current distal end position, which is the placement position P9, to the future workpiece position of the workpiece 11c and further to the target placement position, which is the placement position P3. Note that, all the positions of the workpieces 11 in FIG. 4 show the future workpiece positions. This completes the pick and place task for the workpiece 11c, and, subsequently, the pick and place task for the next workpiece 11 is started. That is, at the time when the pick and place task for the workpiece 11c has completed, the workpiece selecting section 13 selects another workpiece 11 as a next target workpiece 11 which is a target of the pick and place task among the plurality of the workpiece 11.

Figure 5:
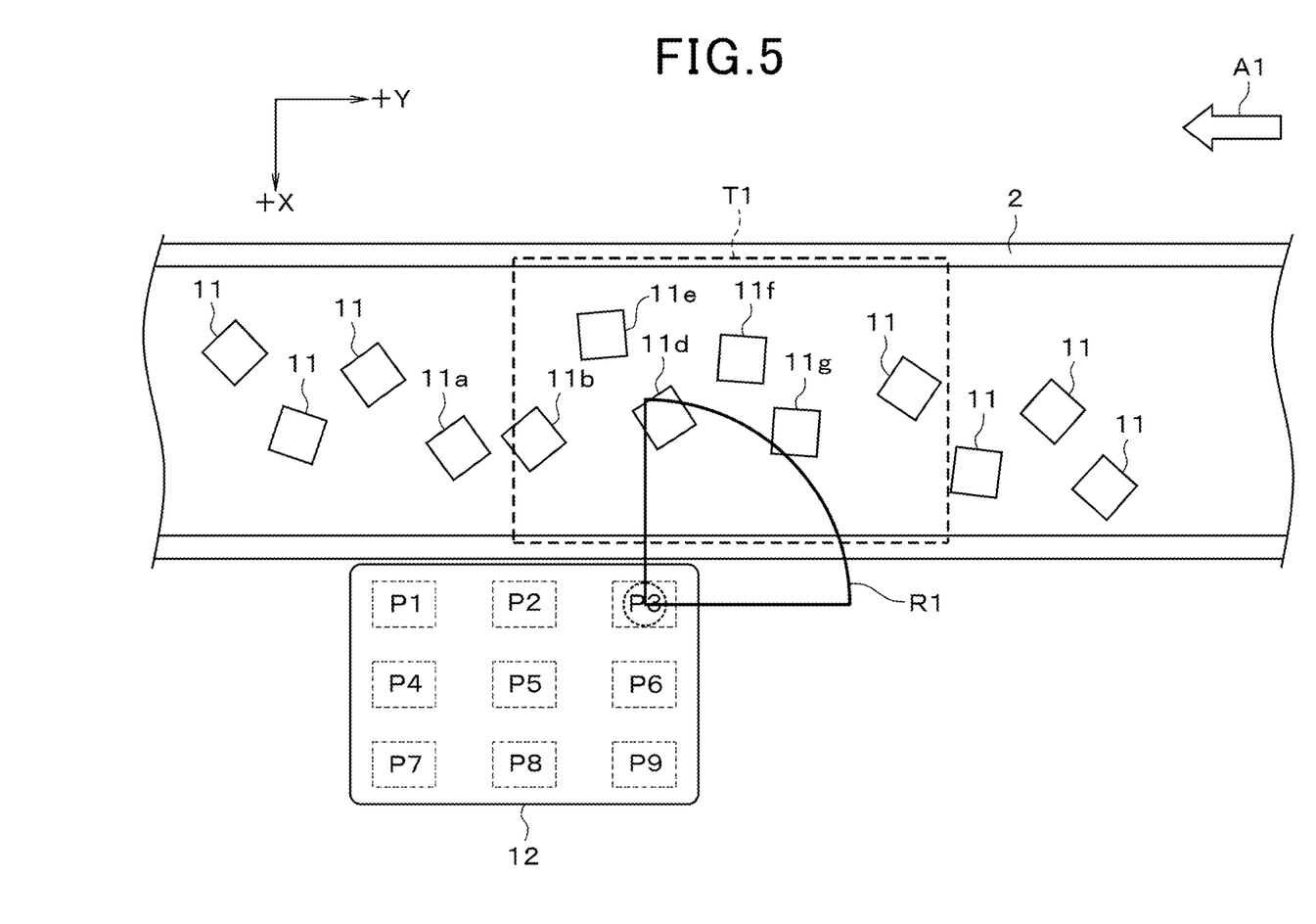
FIG. 5 is an explanatory diagram of an example of a specific motion regarding the pick and place task according to the first embodiment.

In this case, since the distal end of the robot arm 3 is located at the placement position P3 as shown in FIG. 5, the placement position P3 will be the current distal end position. Note that, all the positions of the workpieces 11 in FIG. 5 show the current workpiece positions. The workpiece selecting section 13 forms, as shown in FIG. 5, the first search range R1, which is a sector of 90 degrees with its center at the current distal end position, in the same manner as in the previous task and selects the workpiece 11 detected first in the first search range R1 as the target workpiece. In this case, since the workpiece selecting section 13 detected the workpiece 11d first in the first search range R1, the workpiece 11d is selected as the target workpiece.

Figure 6:
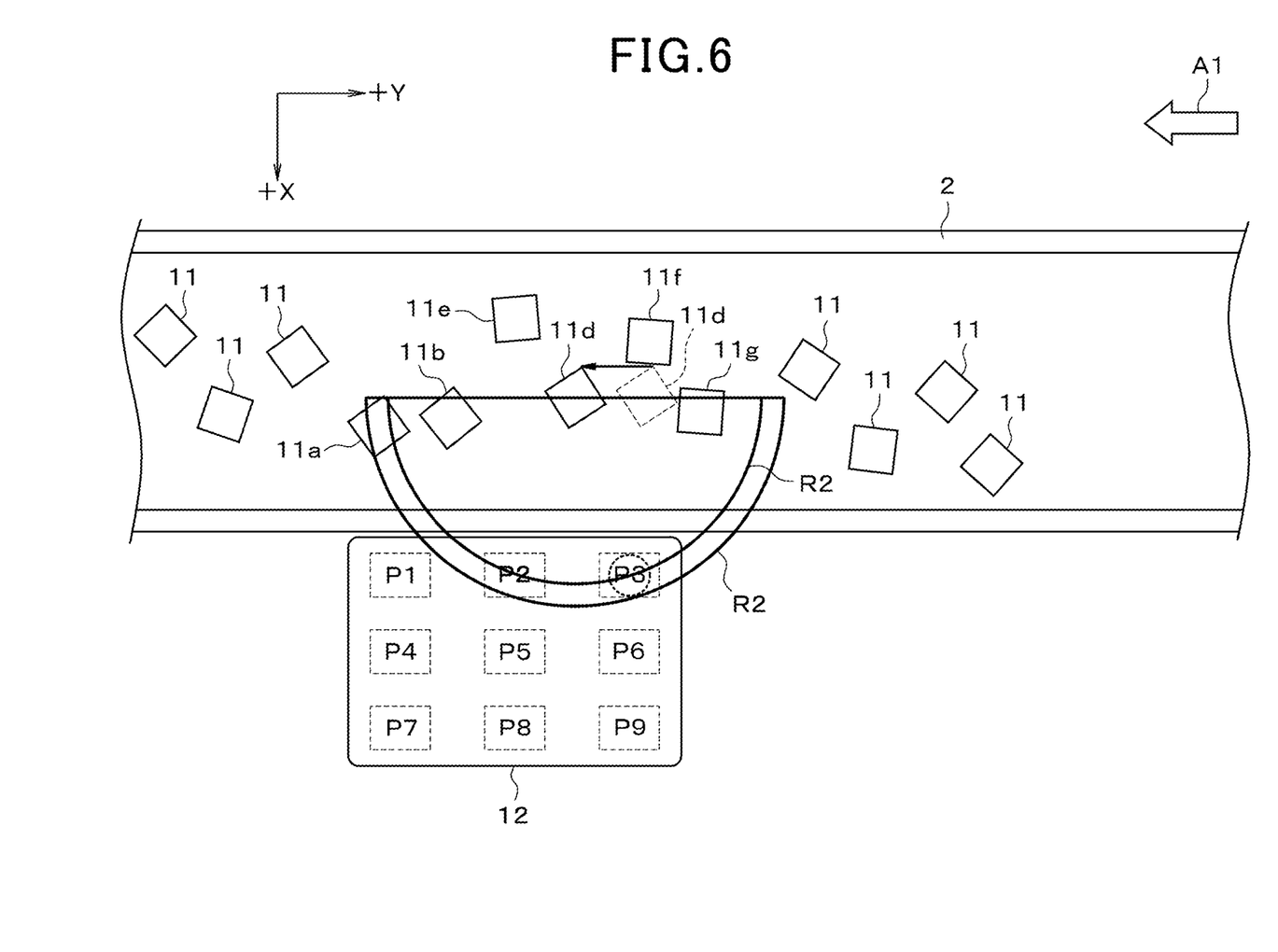
FIG. 6 is an explanatory diagram of an example of a specific motion regarding the pick and place task according to the first embodiment.

Subsequently, the controller 6 obtains the future workpiece position, which is the estimated position of the target workpiece, which is the workpiece 11d in this case, at the point in time when the robot arm 3 picks up the workpiece 11d. Note that, in FIG. 6, the future workpiece positions of the workpieces 11 are shown by solid lines, and the current workpiece position of the workpiece 11d is shown by a dashed line. As shown in FIG. 6, the future workpiece position of the workpiece 11d is shifted from the current workpiece position in the negative Y-axis direction by an amount corresponding to the time required for the robot arm 3 to move to pick up the workpiece 11d.

The position selecting section 14 forms, as shown in FIG. 6, the second search range R2, which is a sector of 180 degrees with its center at the future workpiece position of the workpiece 11d, in the same manner as in the previous task and selects the placement position detected first in the second search range R2 as the target placement position. In this case, the position selecting section 14 detects the placement position P3 first in the second search range R2, but the workpiece 11c has already been placed in the placement position P3. Thus, the position selecting section 14 does not select the placement position P3 as the target placement position and keeps looking for the placement position. Subsequently, the position selecting section 14 detects the placement position P2 in the second search range R2 and thus selects the placement position P2 as the target placement position.

Figure 7:
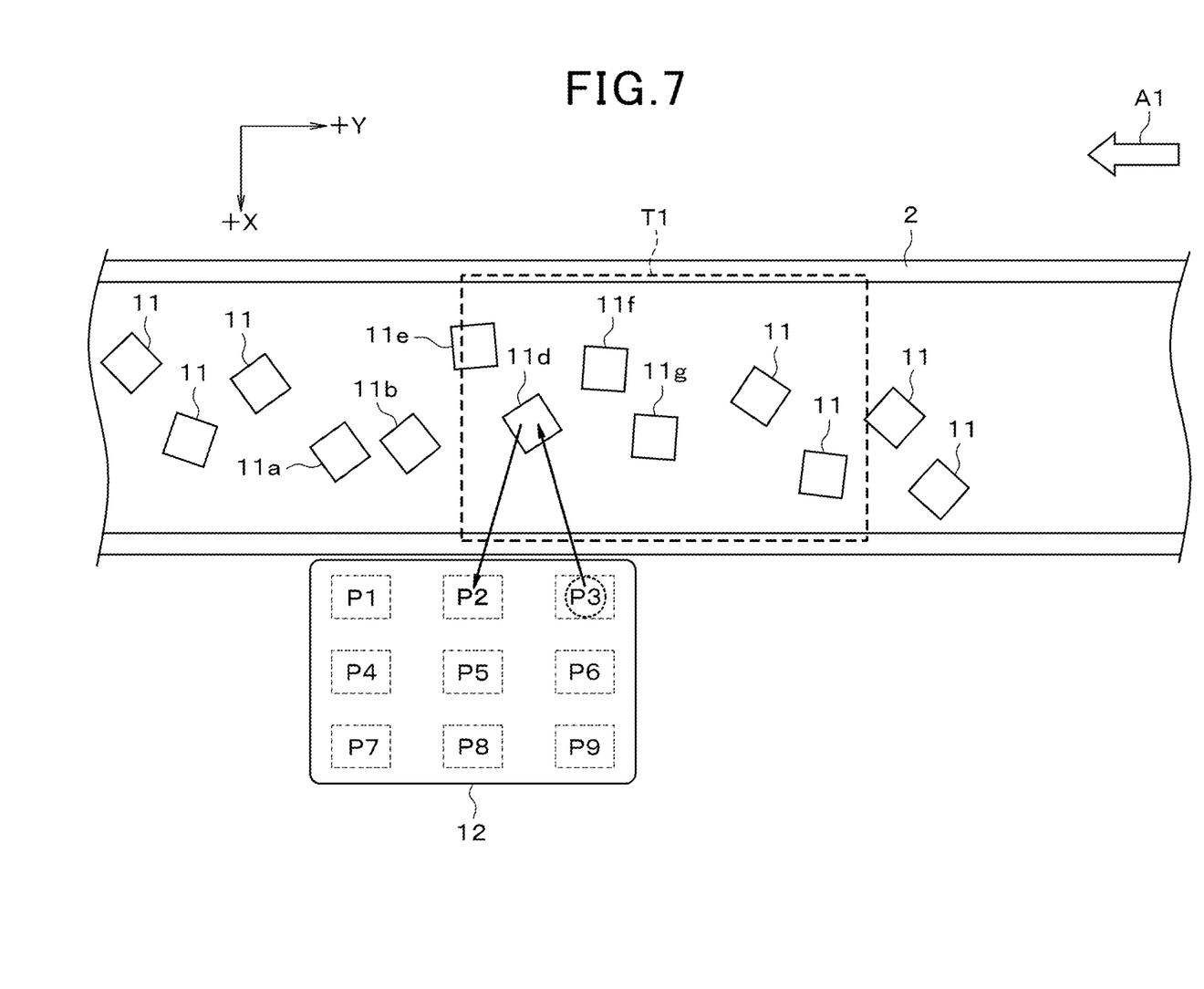
FIG. 7 is an explanatory diagram of an example of a specific motion regarding the pick and place task according to the first embodiment.

Subsequently, the motion control section 15 controls the motion of the robot arm 3 to pick up the workpiece 11d selected as the target workpiece by the workpiece selecting section 13 and place the workpiece 11d at the placement position P2 selected as the target placement position by the position selecting section 14. As shown by a solid arrow in FIG. 7, the motion trajectory of the robot arm 3 in this case extends from the current distal end position, which is the placement position P3, to the future workpiece position of the workpiece 11d and further to the target placement position, which is the placement position P2. Note that, all the positions of the workpieces 11 in FIG. 7 show the future workpiece positions. This completes the pick and place task for the workpiece 11d, and, subsequently, the pick and place task for the next workpiece 11 is started.

In the present embodiment, the operation as described above is repeatedly executed, so that the workpieces 11 are placed in all of the placement positions P1 to P9 in the associated placement tray 12. Note that, in this case, as shown in FIG. 7, the workpieces 11a, 11b, and lie move downstream of the tracking range without being picked up by the robot arm 3 and will be the missed workpieces missed by the robot arm 3. However, the workpieces 11a, 11b, and lie missed by the robot arm 3 can be picked up by the operation performed by the robot arms 4 and 5 located downstream.

In this case, the workpieces 11 are continuously placed in one of the two placement trays 12, but the workpieces 11 may be alternatively placed in the two placement trays 12 so that the workpieces 11 are equally placed in both the two placement trays 12. In such a case also, the pick and place task is executed in the same manner by the specific motion as described above.

Next, an example of a specific routine regarding the pick and place task performed by the controller 6, which controls the robot arm 3 configured as described above, will be described with reference to FIG. 8. Note that, in this description, the process up to when the motion trajectory of the robot arm 3 is determined will be described, and the description of the process after the motion trajectory is determined will be omitted. First, at step S1, the current distal end position of the robot arms 3 is acquired. At step S2, the first search range R1 is formed which is a search range having a sector of 90 degrees extending in the negative X-axis direction and the positive Y-axis direction with its center at the current distal end position. At step S3, it is determined whether any workpiece 11 is detected in the first search range R1.

Figure 8:
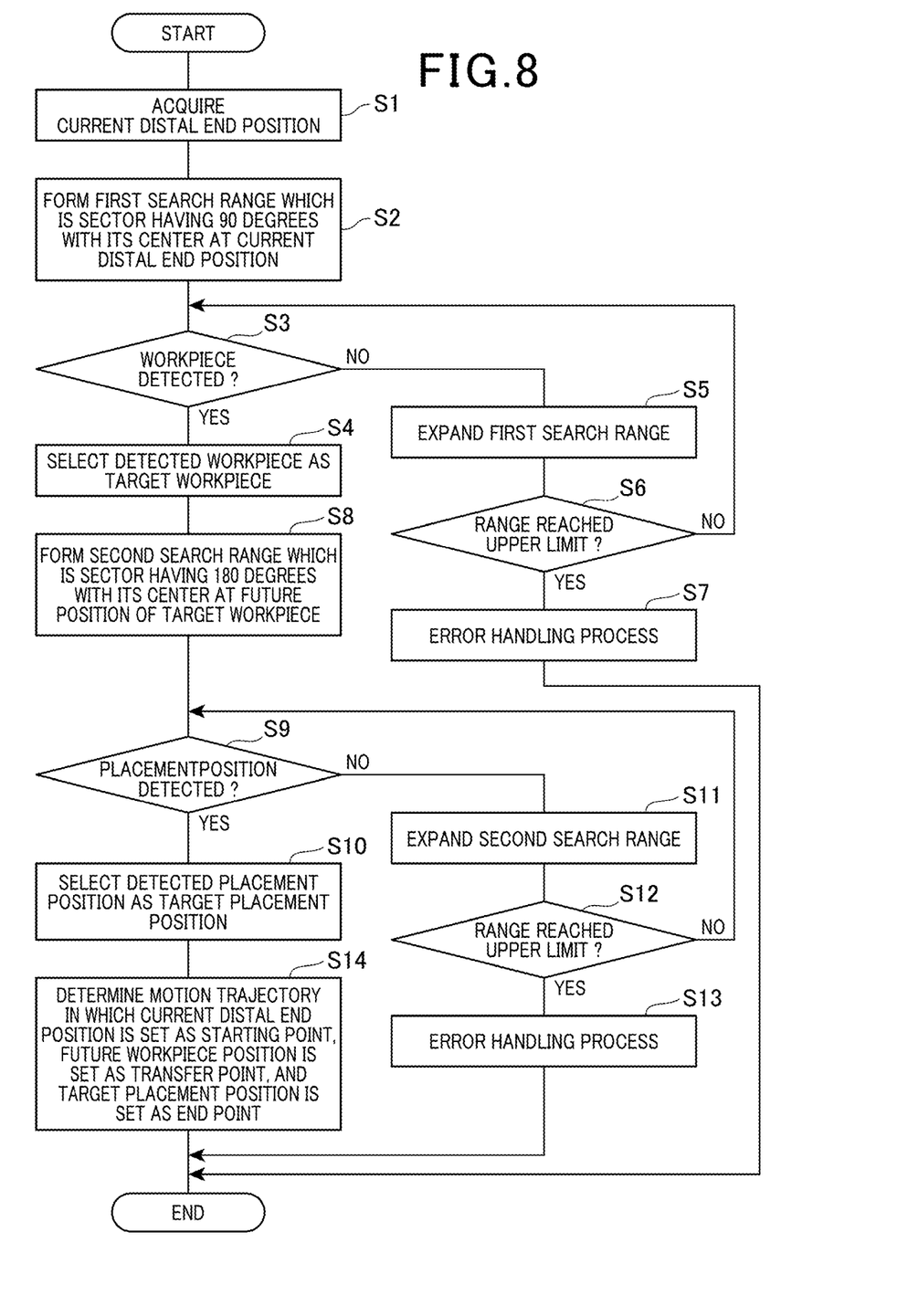
FIG. 8 is a flowchart showing an example of a specific routine regarding the pick and place task according to the first embodiment.

If the workpiece 11 is detected in the first search range R1, the decision outcome of step S3 is "YES", and the process proceeds to step S4. At step S4, the detected workpiece 11 is selected as the target workpiece. If no workpiece 11 is detected in the first search range R1, the decision outcome of step S3 is "NO", and the process proceeds to step S5. At step S5, the first search range R1 is expanded in such a manner that the radius of the sector is increased by a predetermined value. After the execution of step S5, the process proceeds to step S6, and it is determined whether the first search range R1 has reached the upper limit. Note that, the upper limit of the first search range R1 may be determined based on, for example, the upper limit of the movable range of the robot arm 3 or the upper limit of the time required for the robot arm 3 to perform the pick and place task.

If the first search range R1 is less than the upper limit, the decision outcome of step S6 is "NO", and the process returns to step S3 to continue searching for the workpiece 11. If the first search range R1 has reached the upper limit, the decision outcome of step S6 is "YES", and the process proceeds to step S7. At step S7, a predetermined error handling process is executed since no workpiece 11 to be selected as the target workpiece has been detected. After the execution of step S7, the present routine is terminated. After the execution of step S4, the process proceeds to step S8, and the second search range R2 is formed which is a search range having a sector of 180 degrees extending toward the placement tray 12 with its center at the future workpiece position of the target workpiece.

At step S9, it is determined whether any placement position is detected in the second search range R2. If the placement position is detected in the second search range R2, the decision outcome of step S9 is "YES", and the process proceeds to step S10. At step S10, the detected placement position is selected as the target placement position. If no placement position is detected in the second search range R2 or the workpiece 11 is already placed in the detected placement position, the decision outcome of step S9 is "NO", and the process proceeds to step S11. At step S11, the second search range R2 is expanded in such a manner that the radius of the sector is increased by a predetermined value. After the execution of step S11, the process proceeds to step S12, and it is determined whether the second search range R2 has reached the upper limit. Note that, the upper limit of the second search range R2 is set to a range wider than the range that exactly covers all the placement positions P1 to P9 in the placement tray 12 by a predetermined margin.

If the second search range R2 is less than the upper limit, the decision outcome of step S12 is "NO", and the process returns to step S9 to continue searching for the placement position. If the second search range R2 has reached the upper limit, the decision outcome of step S12 is "YES", and the process proceeds to step S13. At step S13, a predetermined error handling process is executed since no placement position to be selected as the target placement position has been detected. After the execution of step S13, the present routine is terminated. After the execution of step S10, the process proceeds to step S14. At step S14, a motion trajectory is determined in which the current distal end position is set as a starting point, the future workpiece position is set as a transfer point, and the target placement position is set as an end point. After the execution of step S14, the present routine is terminated.

The present embodiment described above has the following advantageous effects.

The controllers 6 and 7 of the present embodiment include the workpiece selecting section 13, which selects the workpiece 11 to be picked up and placed, or the target workpiece, among the workpieces 11, and the position selecting section 14, which selects the placement position in which the target workpiece will be placed, or the target placement position, among the placement positions. The workpiece selecting section 13 selects the target workpiece based on the following selection criterion. That is, the workpiece selecting section 13 sets some of the workpieces 11 the current workpiece positions of which are upstream of the current distal end position of the associated robot arm 3 or 4 in the flow direction A1 of the conveyor belt 2 as candidates for selection and selects, as the target workpiece, the workpiece 11 that has the shortest distance from the current distal end position to the current workpiece position among the workpieces 11 that are the candidates for selection.

Although the time required for the pick and place task also depends on the orientation of the robot arms 3 and 4, the time mainly depends on the moving distance of the robot arms 3 and 4 from the current distal end position to the future workpiece position, which is the position of the target workpiece at the point in time when the target workpiece is picked up, and the moving distance of the robot arms 3 and 4 from the future workpiece position of the target workpiece to the target placement position. Hereinafter, among these moving distances, the former moving distance is referred to as a first moving distance, and the latter moving distance is referred to as a second moving distance. According to the selection criterion of the target workpiece in the above configuration, among the workpieces 11 that are the candidates for selection, the workpiece 11 that has the shortest first moving distance is selected as the target workpiece. This shortens the time required for the pick and place task.

In this case, the workpiece selecting section 13 sets the workpieces 11 the current workpiece positions of which are upstream of the current distal end position in the flow direction A1 as the candidates for selection, and the workpieces 11 the current workpiece positions of which are downstream of the current distal end position in the flow direction are not included in the candidates for selection. The reason for this setting is as follows. That is, the workpieces 11 are conveyed in the flow direction A1 by the conveyor belt 2, and the positions of the workpieces 11 move in the flow direction every moment.

Due to this configuration, if the workpiece 11 the current workpiece position of which is downstream of the current distal end position in the flow direction A1 is selected as the target workpiece, the target workpiece continues moving in a direction that surely separates from the robot arm 3 or 4 while the robot arm 3 or 4 moves from the current distal end position toward the target workpiece. This results in unnecessarily increasing the first moving distance of the robot arm 3 or 4, or, in the worst case, the robot arm 3 or 4 may fail to pick up the target workpiece.

In contrast, if the workpiece the current workpiece position of which is upstream of the current distal end position in the flow direction is selected as the target workpiece, the target workpiece mostly moves toward the robot arm 3 or 4 while the robot arm 3 moves from the current distal end position toward the target workpiece. Thus, the possibility that the robot arm 3 or 4 fails to pick up the target workpiece is very low, and the first moving distance is shortened. Thus, as in the above configuration, by setting the workpieces 11 the current workpiece positions of which are upstream of the current distal end position in the flow direction A1 as the candidates for selection, the time required for the pick and place task is shortened while decreasing the possibility that the robot arm 3 or 4 fails to pick up the workpiece.

The position selecting section 14 selects, as the target placement position, the placement position that has the shortest distance from the future workpiece position, which is the position of the target workpiece at the point in time when the workpiece 11 is picked up by the robot arm 3 or 4, among the placement positions P1 to P9 in the placement tray 12. That is, in this case, the position selecting section 14 selects, as the target placement position, the placement position that has the shortest second moving distance of the robot arm 3 or 4 among the placement positions P1 to P9. Thus, according to the above configuration, the first moving distance and the second moving distance, which mainly determine the time required for the pick and place task, are both shortened. As a result, the time required for the pick and place task is further shortened.

The production system 1 of the present embodiment includes the conveyor belt 2, which conveys the workpieces 11 in the predetermined flow direction A1, the robot arms 3, 4, and 5, which perform pick and place tasks in which each of the robot arms 3, 4, and 5 picks up one of the workpieces 11 conveyed by the conveyor belt 2 and places the picked up workpiece 11 at one of the predetermined placement positions, and the controllers 6, 7, and 8. In this case, the robot arms 3, 4, and 5 are arranged along the flow direction A1 to be in line from the upstream section to the downstream section in the flow direction A1.

Among the robot arms 3, 4, and 5, the controllers 6 and 7 that control the robot arms 3 and 4 other than the robot arm 5 located at the most downstream section in the flow direction A1 both have the unique configuration and function as described above. The selection criterion of the target workpiece used by these controllers 6 and 7 puts the highest priority in shortening the time required for the pick and place task. This may result in causing the missed workpieces 11. However, in the production system 1 according to the above configuration, the robot arms 3 and 4 that may miss the workpieces 11 are not located at the most downstream section in the flow direction A1, and the robot arm 5 is located further downstream.

Thus, even if the robot arms 3 and 4 controlled by the controllers 6 and 7 miss any workpiece 11, the robot arm 5 located downstream of the robot arms 3 and 4 can pick up the missed workpiece 11. Moreover, in this case, the robot arm 5 is designed to select and pick up one of the workpieces 11 located most downstream in the flow direction A1 placing the highest priority on reliably preventing the occurrence of the missed workpieces 11. Thus, according to the above configuration, the overall production system 1 shortens the time required for the pick and place task while preventing the occurrence of the missed workpieces 11.

When the first search range R1 reaches the upper limit, the workpiece selecting section 13 does not select the target workpiece, that is, quits picking up the workpiece 11 at that point in time. With the upper limit of the first search range R1 determined based on the upper limit of the time required for the robot arms 3 and 4 to perform the pick and place task, when there is only the workpiece 11 that has extremely long first moving distance in the tracking range T1, the workpiece selecting section 13 quits picking up such a workpiece 11 and lets the downstream robot arm 5 to perform the task. This contributes in further shortening the time required for the robot arms 3 and 4 to perform the pick and place tasks.

Second Embodiment

A second embodiment will now be described with reference to FIG. 9.

In the present embodiment, the robot arms 3, 4, and 5 place the picked up workpieces 11 at the placement positions P1 to P9 in each placement tray 12 in this order. Thus, the position selecting section 14 of the present embodiment selects, as the target placement position, each of the placement positions P1 to P9 in the order from the one with a smaller number at the end.

Figure 9:
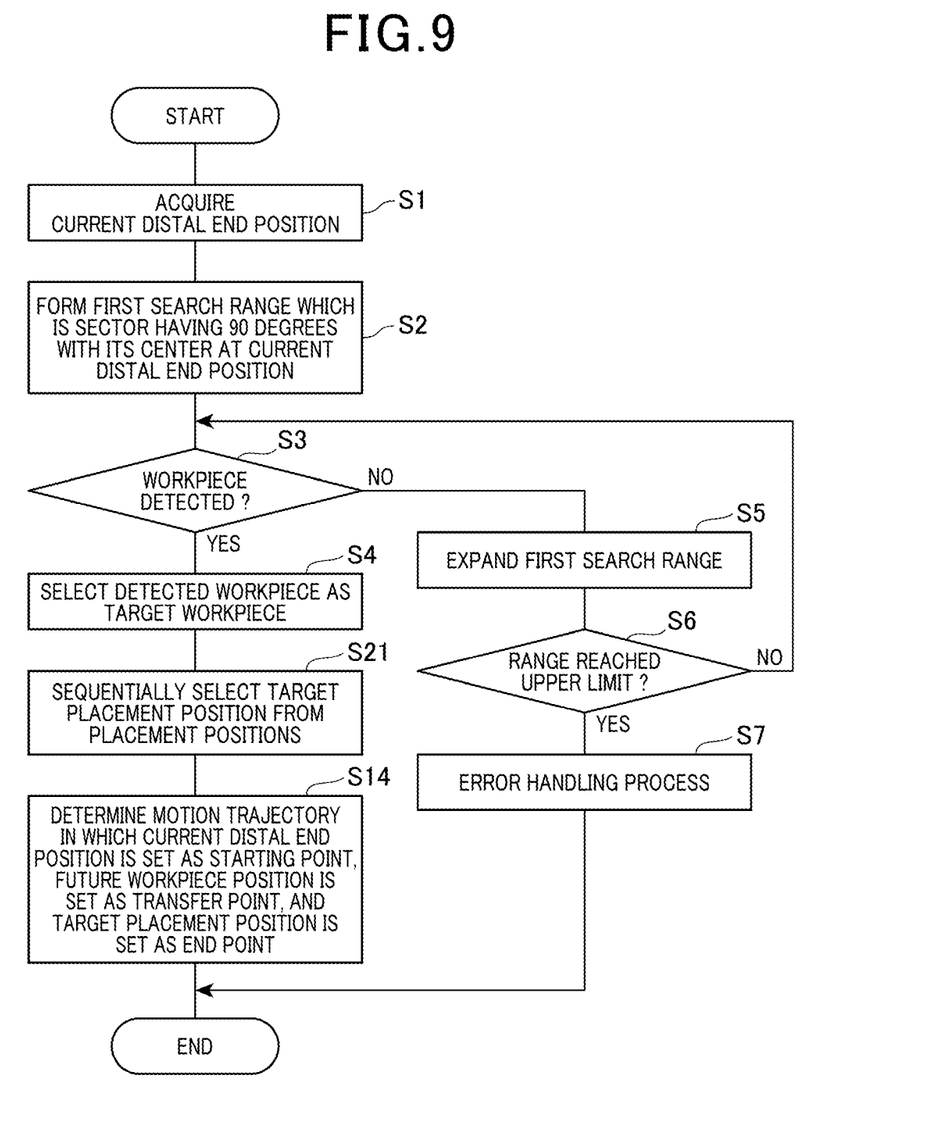
FIG. 9 is a flowchart showing an example of a specific routine regarding a pick and place task according to a second embodiment.

Thus, an example of a specific routine regarding the pick and place task performed by the controller 6 that controls the robot arm 3 of the present embodiment is as shown in FIG. 9, for example. The routine of the present embodiment shown in FIG. 9 differs from the routine of the first embodiment shown in FIG. 8 in that steps S8 to S13 are omitted, and a step S21 is added. In this case, after the execution of step S8, the process proceeds to step S21. At step S21, the target placement position is sequentially selected among the placement positions P1 to P9. After the execution of step S21, the process proceeds to step S14, and the motion trajectory is determined.

According to the present embodiment as described above also, since the target workpiece is selected based on the same selection criterion as that in the first embodiment, the same advantageous effects as that in the first embodiment are achieved. That is, the time required for the pick and place task is shortened while reducing the possibility that the robot arms 3 and 4 fail to pick up the target workpieces and preventing the occurrence of the missed workpiece 11 as the overall production system 1.

Other Embodiments

The present invention is not limited to the embodiments described above and illustrated in the drawings and may be modified, combined, or expanded without departing from the scope of the disclosure.

The numerical values shown in the above embodiments are illustrative and should not be construed as limiting.

The production system 1 includes three robot arms 3, 4, and 5. However, the production system 1 only needs to include multiple robot arms and may include two or four or more robot arms. When the number of the robot arms is changed, only the controllers that control predetermined robot arms other than the robot arm located at the most downstream section in the flow direction A1 of the conveyor belt 2 need to have the configuration and function that are the same as the controller 6 illustrated in the above embodiments.

In the above-mentioned embodiments, there discussed that the robot arm located at the most downstream section in the flow direction among the plurality of the robot arms is configured to pick up a workpiece located at a most downstream section in the flow direction among the plurality of workpieces. However, the present disclosure is not limited to such embodiments. For example, all of the robot arms may be controlled by the above-discussed robot arm control device according to the present disclosure. this embodiment are suitable when the conveyor system is that of a circular type.

In the above-mentioned embodiments, there discussed that at the time when the pick and place task for the present workpiece has completed, the workpiece selecting section selects a next target workpiece. However, the present disclosure is not limited to such embodiments. The workpiece selecting section can select another target workpiece on or after selection of the current target placement position by the position selecting section. That is, when the target placement position for the current target workpiece has decided, a distal end position of the robot arm at a task-start timing, which is a start timing of a next pick and place task, is automatically fixed. In this case, the terms "current distal end position" and "current workpiece position" are respectively replaced with "distal end position at a task-start timing" and "workpiece position at a task-start timing" for the workpiece selection section to properly select a target workpiece.

In the above-mentioned embodiments, there discussed that functional blocks such as the workpiece selection section 13, position selection section 14 and motion control section 15 are implemented by the computer comprising CPU, ROM, RAM and etc. However, the present disclosure is not limited to such embodiments. The functional blocks such as the workpiece selection section 13, position selection section 14 and motion control section 15 may also be implemented using any appropriate semiconductor integrated circuit such as arithmetic units other than CPUs, such as PLDs (Programmable Logic Devices), for example, FPGAs (Field Programmable Gate Arrays) or FPAAs (Field Programable Analog Arrays), ASICs (Application Specific Integrated Circuits), or MPUs (Micro Processing Units). Each functional block is implemented using one semiconductor integrated circuit or using a plurality of semiconductor integrated circuits. One semiconductor integrated circuit may implement a plurality of functional blocks.

The present disclosure is not limited to the controllers 6 and 7 that control the robot arms 3 and 4 applied to the production system 1 and can be applied to general control devices for robot arms that control robot arms that perform pick and place tasks.

What is claimed is:

1. A production system comprising:
a conveyor system that conveys a plurality of workpieces in a predetermined flow direction;
a plurality of robot arms that perform pick and place tasks in which each robot arm picks up one of the workpieces conveyed by the conveyor system and places the picked up workpiece at one of a plurality of predetermined placement positions, the plurality of robot arms are arranged along the predetermined flow direction to be in line from an upstream section to a downstream section in the predetermined flow direction; and
a robot arm control device configured to control one or more of the plurality of robot arms other than the robot arm located at a most downstream section in the predetermined flow direction among the plurality of robot arms, wherein:
the robot arm control device is composed of one or more robot arm control devices arranged, one-to-one, to the one or more of the plurality of robot arms, and each of the one or more robot arm control devices comprises:
a workpiece selecting section configured to select a target workpiece, which is a workpiece to be picked up and placed, among the plurality of workpieces conveyed by the conveyor system in the predetermined flow direction;
a position selecting section configured to select a target placement position, which is the placement position at which the target workpiece will be placed, among the plurality of predetermined placement positions; and
a motion control section configured to control a motion of the robot arm to pick up the target workpiece at a predetermined pick up position and place the target workpiece at the target placement position selected among the plurality of predetermined placement positions, wherein
the workpiece selecting section is configured to
set some of the workpieces' workpiece positions at a task-start timing of which are upstream of a distal end position of the robot arm at the task-start timing in the predetermined flow direction as candidates for selection, the task-start timing being a start timing of the pick and place task, and
select, among the workpieces that are the candidates for selection, the workpiece that has a shortest distance from the distal end position at the task-start timing to the workpiece position at the task-start timing as the target workpiece; and
the position selecting section selects, as the target placement position, one of the placement positions that has a shortest distance from a future workpiece position, which is a position of the target workpiece at a point in time when the workpiece is picked up by the robot arm.

2. The production system according to claim 1, wherein the workpiece selecting section selects another target workpiece on or after selection of the target placement position by the position selecting section.

3. The production system according to claim 1, wherein the plurality of workpieces is conveyed so that two or more among the plurality of workpieces exist in a width direction, which is orthogonal to the predetermined flow direction, of the conveyor system.

4. The production system according to claim 1, wherein the robot arm located at the most downstream section in the predetermined flow direction is configured to pick up a workpiece located at the most downstream section in the predetermined flow direction among the plurality of workpieces conveyed by the conveyor system and place the picked up workpiece at one of the plurality of predetermined placement positions.

5. The production system according to claim 1, wherein the plurality of predetermined placement positions are set as placement trays placed in the predetermined flow line on both sides of the conveyor system.

* * * * *